July 24, 1962
R. E. BELAU ET AL
3,045,648
FLUID PRESSURE-ACTUATED TOOL
Filed Feb. 24, 1960
4 Sheets-Sheet 1
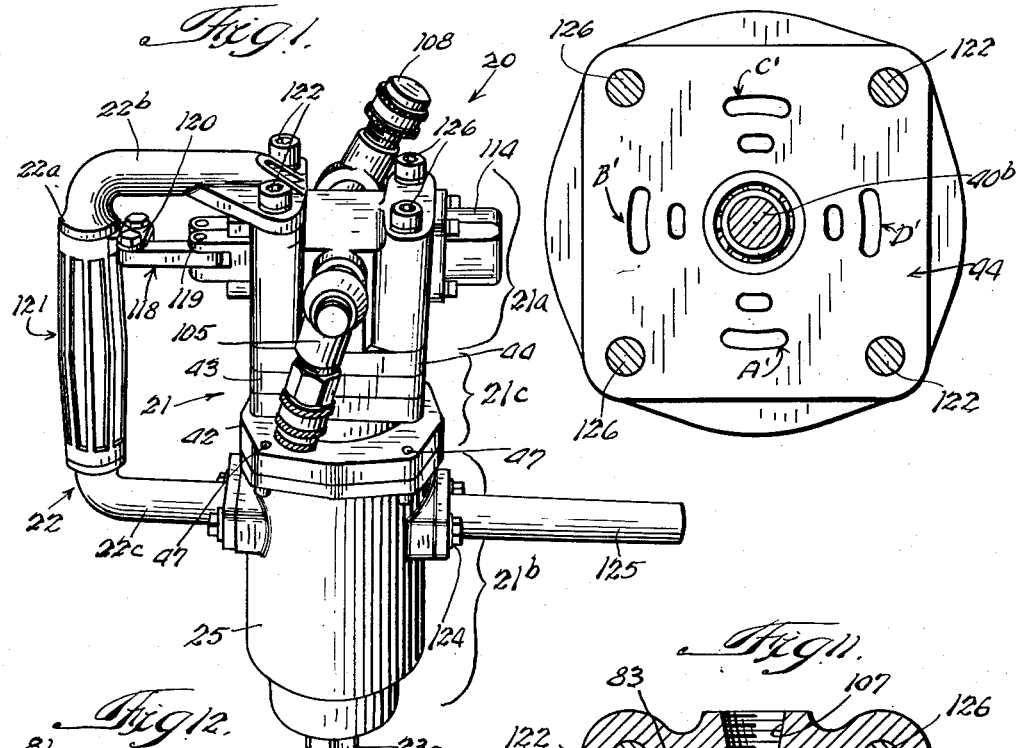
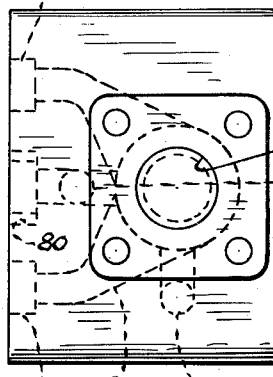
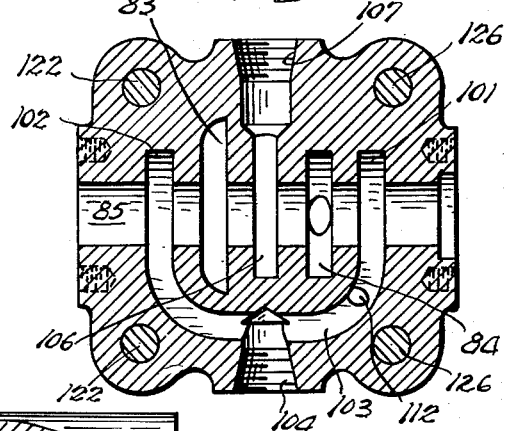
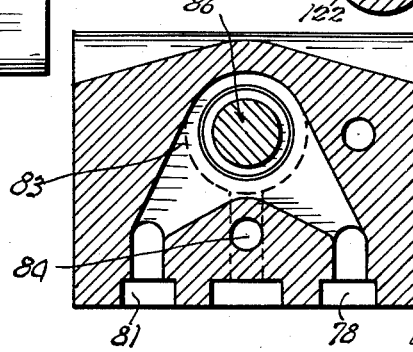
INVENTORS
Roger E. Belau
& Nils S. Lind.
BY

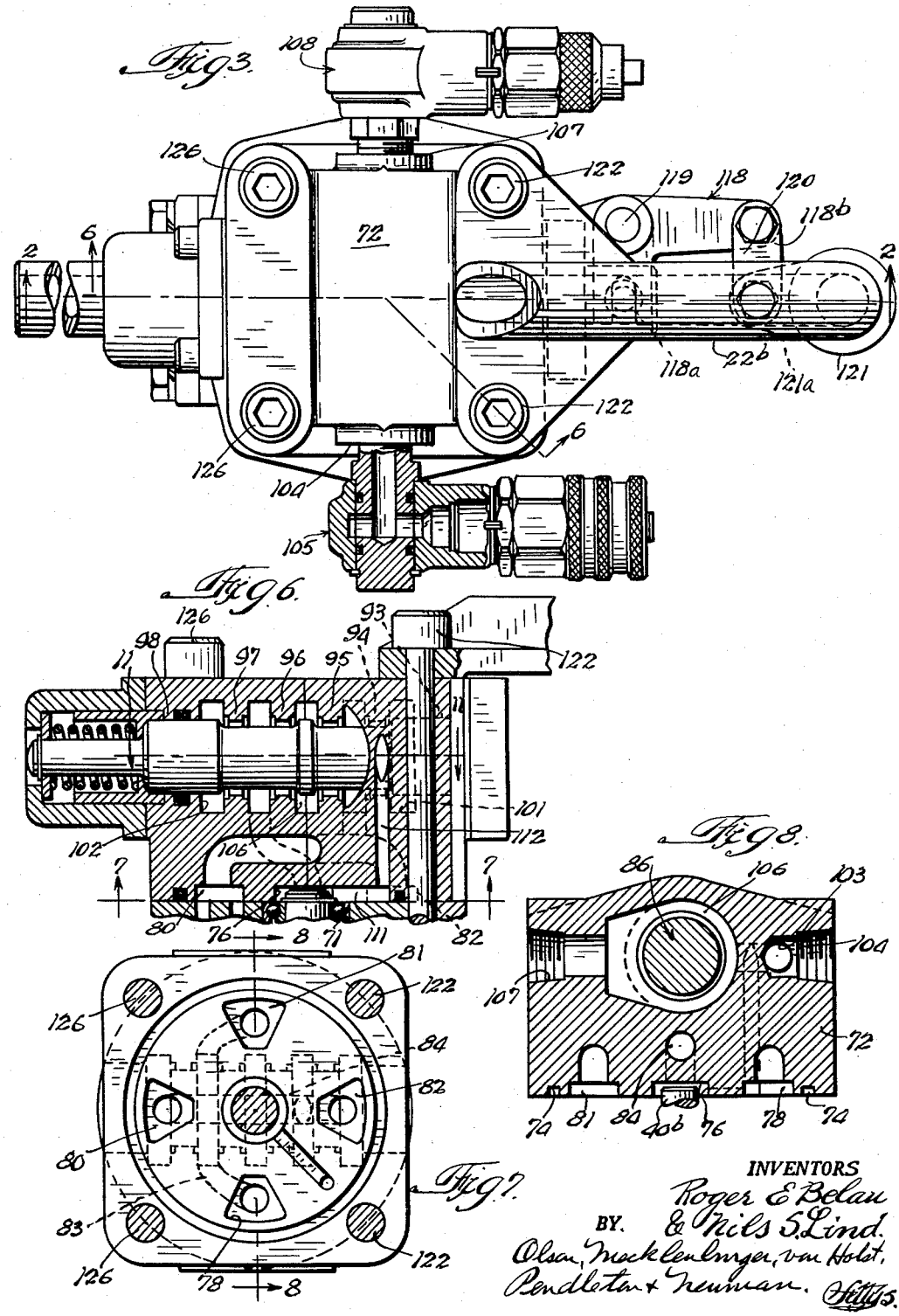

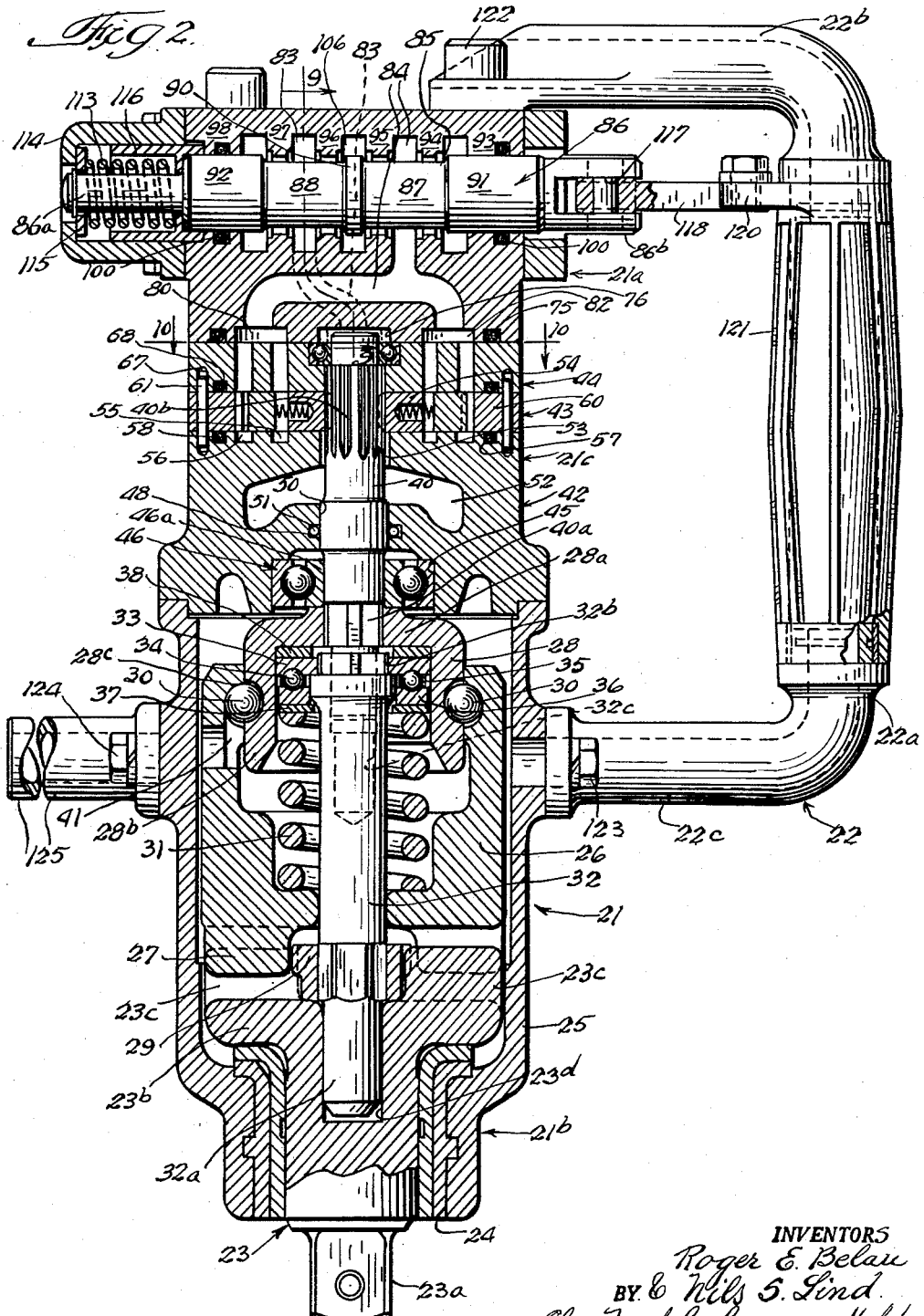

July 24, 1962 R. E. BELAU ET AL 3,045,648
FLUID PRESSURE-ACTUATED TOOL
Filed Feb. 24, 1960 4 Sheets-Sheet 4
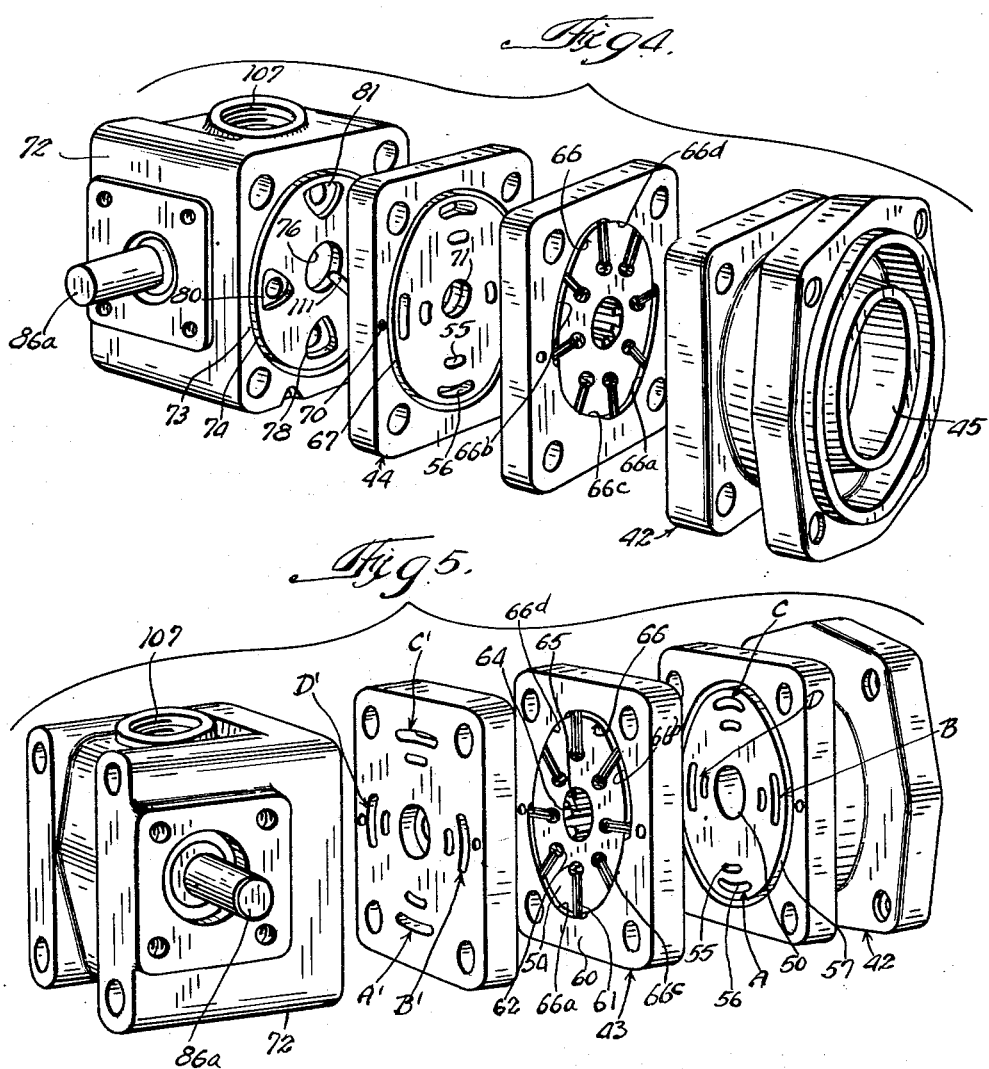
INVENTORS
Roger E. Belau
BY & Nils S. Lind United States Patent Office 3,045,648
Patented July 24, 1962

3,045,648
FLUID PRESSURE-ACTUATED TOOL
Roger E. Belau, Fairmont, and Nils S. Lind, Welcome, Minn., assignors to Fairmont Railway Motors, Inc., Fairmont, Minn., a corporation of Minnesota
Filed Feb. 24, 1960, Ser. No. 10,733
7 Claims. (Cl. 121—34)

This invention relates to a fluid pressure-actuated tool, preferably of a portable type, and capable of imparting a high degree of work energy to the object engaged thereby.

In a tool, such as an impact wrench, which is suitable for use in railway maintenance work, it is important that such a tool be possessed of the following virtues: (a) be capable of withstanding abusive treatment; (b) be of compact and portable design and readily manipulatable; and (c) capable of imparting a powerful torque in opposite directions to the object engaged by the tool, without requiring modification of the tool and without requiring the addition of various attachments thereto.

Various tools of this general type have heretofore been provided which, because of design, are incapable of meeting the aforenoted requirements. For example, in such prior tools, it is customary for the tool to impart driving force or torque in only one direction and, therefore, in order to impart the force in the opposite direction necessitates either applying some complex direction-changing adapter to said tool, or the relocation of the power input connection on the tool itself. In instances where an adapter is utilized, the tool becomes awkward and cumbersome to manipulate and severely curtails the utilization of the tool in locations which might otherwise be accessible. Furthermore, such prior tools customarily utilize numerous external conduits or hose which also contribute materially to the bulkiness of the tool and the awkwardness of handling same.

Thus, it is one of the objects of this invention to provide a tool which is of compact and durable construction and may be readily manipulated by the operator.

It is a further object of this invention to provide a tool which is capable of imparting a powerful driving torque in opposite directions to the object being engaged by the tool, without requiring an adapter being applied to the tool or the re-locating of any power input connections on the tool itself.

It is a still further object of this invention to provide a tool which eliminates numerous external conduits normally found on tools of this type, and thereby the utility and maneuverability of the tool is materally increased.

It is a still further object of this invention to provide a tool which is capable of performing a wide variety of mechanical operations.

Further and additional objects will appear from the description, accompanying drawings, and appended claims.

In accordance with one embodiment of this invention, a fluid pressure-actuated tool is provided which comprises an elongated driving member mounted for rotation about its longitudinal axis, a fluid-responsive element mounted on said driving member for imparting rotation thereto, and control means in fluid communication with said element for controlling the direction of rotation of said driving member and element. The control means includes a housing provided with an elongated cavity and a high-pressure fluid inlet which communicates at a first location with the cavity at substantially its longitudinal midpoint. A fluid outlet is also provided on the housing which communicates with the cavity at second locations disposed on opposite sides of and longitudinally spaced from the first location. Communicating with the cavity at third locations, disposed intermediate the first and second locations, are the corresponding ends of conduits formed within the control means housing. The other ends of the conduits are in fluid communication with the fluid-responsive element and are symmetrically arranged about the rotary axis of the driving member. Mounted for longitudinal adjustment within the cavity is an elongated shuttle which, when actuated to one selected position of adjustment, permits high-pressure fluid to pass through only one of the pair of conduits and thus cause the driving member and element to rotate in one direction. The shuttle, when actuated to a second selected position of adjustment, permits high-pressure fluid to pass through only the other of the pair of conduits and cause the driving member and element to rotate in the opposite direction. The shuttle is biased to normally assume a neutral third position wherein high-pressure fluid passes from the first location to the second locations in the cavity, whereupon the driving member and element assume a nonrotating position.

For a more complete understanding of this invention, reference should be made to the drawings, wherein:

FIGURE 1 is a perspective view of the improved tool;

FIG. 2 is an enlarged vertical sectional view taken along line 2—2 of FIG. 3;

FIG. 3 is an enlarged fragmentary top plan view of the improved tool;

FIG. 4 is a fragmentary perspective view of the improved tool looking backwardly toward the control end thereof and with various structural elements thereof shown in exploded relation;

FIG. 5 is similar to FIG. 4, but looking forwardly toward the driving end of the tool;

FIG. 6 is a fragmentary sectional view taken along line 6—6 of FIG. 3;

FIG. 7 is a fragmentary sectional view taken along line 7—7 of FIG. 6;

FIG. 8 is a fragmentary sectional view taken along line 8—8 of FIG. 7;

FIG. 9 is a fragmentary sectional view taken along line 9—9 of FIG. 2;

FIG. 10 is a fragmentary sectional view taken along line 10—10 of FIG. 2;

FIG. 11 is a fragmentary sectional view taken along line 11—11 of FIG. 6; and

FIG. 12 is a fragmentary left-hand end view of FIG. 11.

Referring now to the drawings and more particularly to FIGS. 1 and 2, a pressure-actuated tool 20 is shown which, in this instance, is of a form adapted primarily for use as an impact wrench; the latter being of a type employed in railway maintenance operations. It is to be understood, of course, that the utilization of the inventive concept in such an application is not to be limited thereto, but is merely for illustrative purposes and to facilitate understanding thereof.

The tool 20, as shown in FIG. 1, is composed basically of a body unit 21 and a handle 22 associated therewith. The unit 21, in this instance, consists of an assembly of independent parts which will be described in detail hereinafter.

The upper or rear portion 21a of unit 21, as viewed in FIG. 2, is to be hereinafter designated "control end," while the opposite, or lower portion 21b of the unit is to be designated "drive end." Intermediate the control and drive ends 21a and 21b is a central portion 21c of unit 21, which functions to convert the hydraulic driving force introduced into the tool at the control end into mechanical torque at the drive end.

DRIVE END

The various elements which comprise the drive end 21b of unit 21 form no part of the inventive concept, except to show a mechanical arrangement for producing driving torque. The drive end 21b, illustrated and described hereinafter, in this instance is of a type manufactured and sold by Ingersoll-Rand Company. Notwithstanding this fact, the drive end 21b will be hereinafter described in some detial so that understanding of the invention will be facilitated.

SPINDLE

The drive end 21b includes a rotating spindle 23 which has the lower end 23a thereof protruding through an opening 24 formed in an outer hollow casing 25. The protruding spindle end 23a is adapted to have removably fitted thereon a socket piece or the like, not shown, which is suitable for encompassing a bolt head or nut. The concealed upper end 23b of the spindle 23 is enlarged and is provided with upwardly projecting lugs 23c symmetrically arranged about the axis of rotation of the spindle.

HAMMER PIECE

Disposed within the interior of casing 25 and above spindle 23 is a rotatable hammer piece 26 which is hollow and open at opposite ends, as shown in FIG. 2. Hammer piece 26 has projecting downwardly from its lower end lugs 27, which are adapted to intermittently engage or mesh with lugs 23c on spindle 23 and cause rotary power to be imparted to spindle 23. In addition to being rotated, hammer piece 26 is capable of moving in an axial direction. It is because of this axial movement that the power imparted to the spindle is of an intermittent character. As aforementioned, piece 26 is of hollow construction and has disposed within the interior thereof a cam 28, cam balls 30, hammer coil spring 31, and a first drive shaft 32. The shaft 32 is positioned coaxially with respect to the spindle rotary axis. The lower end 32a of the shaft 32 is journalled within a bearing pocket 23d formed in the upper end 23b of spindle 23. The upper end 32b of shaft 32 is provided with an axially disposed bearing pocket 32c, the function of which will be described hereinafter. The outer periphery of end 32b is faceted and is adapted to be encompassed by a bearing race 33 which is adapted to rotate therewith. Race 33 has the undersurface thereof provided with an annular groove to accommodate a plurality of balls 34 carried by a cage 35. The underside of the balls 34 and race 35 are supported by a race 36. Disposed beneath race 36 and held in contact therewith by hammer coil spring 31 is a friction ring 37. A similar friction ring 38 is disposed above and in contact with the upper bearing race 33; this latter friction ring is interposed race 33 and the base portion 28a of cam 28.

CAM

Cam 28 is of an inverted cup shape and the base portion 28a thereof is provided with a central opening to accommodate the faceted peripheral portion 40a of a second drive shaft 40. Shaft 40 forms a part of the central portion 21c of unit 21, to be described more fully hereinafter. Thus, cam 28 and shaft 40 are adapted to rotate as a unit. The lower end of shaft 40 terminates in the bearing pocket 32c formed in the first drive shaft 32. The outer periphery of the depending portion 28b of cam 28 is provided with a plurality of tortuous grooves 28c in which are disposed cam balls 30. Cam balls 30 are likewise disposed within internal tortuous grooves 41 formed in the upper end portion of hammer piece 26. The function of cam balls 30 and hammer piece grooves 41 is to provide means for effecting axial adjustment of the hammer piece 26.

OPERATION OF DRIVE END

Under low torque requirements the cam 28 will drive shaft 32 and a spindle driver 29 mounted thereon (see FIG. 2) through friction ring 38 and bearing race 33. At the same time the cam 28 will drive hammer 26 through balls 30. However, once the torque requirements at the protruding end 23a of spindle 23, to turn an engaged object, not shown, exceed a predetermined amount, the hammer 26 will rotate at a slower rate than the cam 28, whereupon balls 30 will move in the internal grooves 41 of hammer 26 and cause the latter to move axially upwardly until the meshing lugs 27 and 23c of pieces 26 and 23, respectively, are disengaged. As piece 26 moves upwardly, spring 31 will become compressed. As soon as the lugs have disengaged, hammer 26 will again pick up a high rotating speed and the spring will return the hammer 26 to its initial position in relation to cam 28. The hammer is now in position to impart another impact to spindle 23. Immediately after the impact between lugs 27 and 23c of piece 26 and 23, respectively, the spindle driver 29 will absorb the rebound of spindle 23. The rebound is transmitted through the spindle driver 29, shaft 32 and bearing race 23 until it is adsorbed by friction between friction ring 38 and cam 28. This action keeps the spindle 23 up against the load at all times.

CENTRAL PORTION

The central portion 21c of unit 21, as seen in FIG. 2 comprises, in addition to shaft 40, an adapter member 42 mounted in mating engagement on the upper end of casing 25, a vane assembly unit 43 mounted in coincident relation on the upper surface of member 42, and an adapter plate 44 disposed in coincident relation on the upper surface of unit 43. All of the aforementioned parts of central portion 21c are provided with suitable central openings through which shaft 40 extends.

ADAPTER MEMBER

The lower end of the central opening 50 of adapter member 42 is counterbored at 45 for accommodating a ball-bearing unit 46 which has its inner race 46a encompassing shaft 40. Race 46a rests upon a flattened upper surface of cam 28. Member 42 and hollow casing 25 are held in assembled relation by a plurality of bolts 47 (see FIG. 1) which extend through suitable openings formed in external peripheral flanges of member 42 and casing 25.

An internal groove 48 is formed in the central opening 50 of member 42 and is spaced above the counterbored end 45. An O-ring type seal 51 is accommodated within groove 48 and effects an oil seal between shaft 40 and the lower portion of member 42. Formed within member 42 and axially spaced above seal 51 is an annular cavity 52 in which hydraulic fluid is adapted to accumulate during operation of the tool. The portion of the central opening 50, extending upwardly from cavity 52, is oversized relative to the segment 40b of shaft 40 disposed therein, thus resulting in the formation of a cylindrically-shaped passageway 53 interconnecting cavity 52 with vane assembly unit 43. Shaft segment 40b is splined and is encompassed by a rotor 54 which forms a part of unit 43. The upper surface of member 42, on which unit 43 is disposed, is provided with sets of arcuate-shaped pockets A, B, C and D. Each set of pockets comprises an inner pocket 55 and an outer pocket 56 (see FIG. 5). It will be noted that all of the inner pockets of the sets and all of the outer pockets of the sets are arranged in concentric circles about the central opening 50 formed in the member 42. The relative location and size of pockets 55 and 56 will be described more fully hereinafter. Also formed in the upper face of member 42 and delimiting all of the sets of pockets 55 and 56 is an annular groove 57 which is adapted to accommodate an O-ring type seal 58. The seal 58 prevents oil leakage between the outer peripheral portion of the upper face of member 42 and the lower abutting face of the stator 60 of vane assembly unit 43. Locating pins 61 are also provided which are accommodated within suitable openings formed in the abutting faces of stator 60 and member 42 and thus facilitate correct assembly of the tool.

VANE ASSEMBLY UNIT

The vane assembly unit 43, in this instance, is of conventional construction and is of a balanced type utilized in vane hydraulic pump motors. As seen more clearly in FIGS. 4 and 5, the rotor 54 of unit 43 is provided with a plurality of spring-loaded vanes 61 which are disposed within suitable elongated radially disposed pockets formed in the outer periphery of the rotor. The inner end 62 of each pocket is enlarged and is adapted to successively register with the inner pockets 55 formed in the upper surface of member 42. The outer end of each vane pocket of the rotor 54 successively communicates with outer pockets 56 as the rotor is actuated in a rotary motion. By reason of pockets 55 and 56, each vane is hydraulically balanced. Each vane 61 is free to move longitudinally within the radially disposed pockets of the rotor and is biased to move radially outwardly by reason of a spring 63 disposed within inner end 62. The rotor 54 is provided with a center opening 64 which has a plurality of symmetrically arranged inwardly projecting teeth 65. The opening 64 is adapted to accommodate the splined end 40b of shaft 40 and thus effect unitary rotary motion of the shaft 40 and rotor 54. The outer ends of vanes 61 slidably engage a cammed surface which delimits a central opening 66 formed in stator 60. The cammed surface is provided with a pair of arcuate recessed segments 66a and 66b. Each recessed segment is of substantially the same configuration and defines an arc of approximately 110°. The end limits of each recessed segment uniformly taper to the periphery of the unrecessed segments 66c and 66d of the cammed surface. Recessed segment 66a has the lower end thereof terminating just beyond the right-hand side of pocket 56 of set A, as viewed in FIG. 5. The opposite, or upper, end of recessed segment 66a terminates just above the upper side of pocket 56 of set D, as also shown in FIG. 5. Recessed segment 66b is in the same relative position with respect to pockets 56 of sets B and C formed in the upper surface of adapter member 42. The clearance provided by recessed segments 66a and 66b, with respect to the periphery of rotor 54, is to permit the flow therethrough of hydraulic fluid in a direction either clockwise or counterclockwise, depending upon the adjustment of the control end 21a of the tool. Because of the bias on vanes 61, the latter are caused to move radially outwardly a slight amount as they pass through recessed segments of the cammed surface. It is the force imparted on the radially projecting portions of the vanes by the flowing hydraulic fluid in segments 66a and 66b which effects rotation of rotor 54, shafts 40 and 32, and spindle 23.

The structure and operation of a vane assembly unit such as utilized in the instant tool are described in considerable detail in relation to a vane hydraulic pump motor in an article by John R. English, published in the December 1952 issue of "Applied Hydraulics."

ADAPTER PLATE

Disposed above unit 43 and in coincident relation therewith, is adapter plate 44 (see FIG. 2). The undersurface of plate 44 is provided with an annular groove 67 which is adapted to accommodate an O-ring type of seal 68 and thus effect an oil seal between the peripheral portion of the adapter plate undersurface and the upper surface of the stator 60 abutted thereby. Positioned outside of groove 67 are suitable openings 70 to accommodate the upper ends of locating pins 61. Plate 44, as aforedescribed, is provided with a central opening 71 to freely accommodate the upper splined end 40b of shaft 40. Symmetrically arranged about opening 71 are sets of ports A', B', C' and D', which are in alignment with the corresponding sets of pockets A, B, C and D formed in the upper surface of member 42. Each set of ports A', B', C' and D' is adapted to divide the high-pressure hydraulic fluid flow so that part of the fluid enters the inner ends 62 of the radial pockets formed in rotor 54 and the remainder of the fluid enters the clearance formed between the recessed segments 66a and 66b of the cammed surface of the stator 60 and the peripheral surface of the rotor. As aforenoted, by dividing the high-pressure hydraulic fluid flow, the vanes 61 of the rotor are hydraulically balanced.

CONTROL END

The control end 21a, which embodies the crux of the inventive concept, comprises a hollow housing 72 which has a machined flat face 73 that is adapted to engage the top surface of adapter plate 44. An annular groove 74 is formed in face 73 and is adapted to accommodate an O-ring type seal 75, whereby an oil seal is effected between face 73 and the upper surface of plate 44. A center blind opening 76 is formed in face 73 to accommodate the upper end of shaft 40. The portion of face 73 circumjacent opening 76 is adapted to retain a ball-bearing 77 in the upper end of the opening 71 formed in plate 44 and which is counterbored, as seen in FIG. 2. Symmetrically arranged on face 73 about opening 76 as an axis are four ports, 78, 80, 81 and 82 (see FIGS. 4 and 7) through which hydraulic fluid is caused to flow. The ports 78, 80, 81 and 82 are countersunk at the surface 73 into a substantially keystone configuration so that the countersunk ends will overlie the corresponding sets of ports A', B', C' and D' formed in adapter plate 44.

Diametrically opposed ports 78—81 and 80—82 are interconnected in housing 72 by conduits 83 and 84, respectively (see FIGS. 2 and 7). Conduit 83 has an upwardly extending segment which terminates in an elongated cavity 85 formed adjacent the upper end of casing 72; the longitudinal axis of cavity 85 is substantially transverse to the rotary axis of shaft 40. The other conduit 84 is also provided with an upwardly extending segment which terminates in cavity 85, but such conduit terminus is longitudinally spaced a substantial distance from the terminus of conduit 83 (see FIG. 2).

Disposed within cavity 85 and mounted for longitudinal adjustment therein is an elongated shuttle 86. The periphery of shuttle 86 has formed therein a pair of longitudinally spaced, elongated annular valleys 87 and 88. The purpose of these valleys will be described more fully hereinafter. A relatively narrow annular land or collar 90 separates the two valleys. The opposite ends of valleys 87 and 88 are bounded by relatively wide annular lands or collars 91 and 92 (see FIG. 2). The diameters of lands 90, 91 and 92 are the same and are adapted to slidably engage certain of annular, inwardly projecting, longitudinally spaced shoulders 93, 94, 95, 96, 97 and 98 formed in cavity 85. Shoulders 93 and 98 are formed adjacent the end limits of cavity 85 and each is provided with an internal groove in which is disposed an O-ring type seal 100, to prevent the escape of hydraulic fluid to the outside of housing 72. Formed between shoulders 93—94 and 97—98 are ports 101 and 102, respectively, which are interconnected by a conduit 103 concealed within housing 72 (see FIG. 11). Conduit 103, at approximately its midpoint, communicates with an internally threaded outlet 104, which is adapted to receive a low-pressure external hose connector 105 (see FIG. 1). The connecter 105 is of a swivel type and thus prevents kinking of the hose, not shown, when the tool is manipulated.

Formed between shoulders 95 and 96 is a port 106, which communicates with high-pressure hydraulic fluid inlet 107 (see FIG. 11). It will be noted that inlet 107 is disposed on the opposite side of housing 72 from the location of outlet 104 and is substantially aligned therewith. Inlet 107 is internally threaded and is adapted to receive a swivel-type connector 108 for an external high-pressure hose, not shown; the latter also being connected to a suitable source of hydraulic pressure, not shown.

Communication between high-pressure port 106 and/or ports 83, 84, 101 and 102 is controlled by the relative position of the shuttle 86 within cavity 85. In FIGS. 2 and 6, the shuttle 86 is shown in a neutral position wherein the high-pressure fluid introduced into cavity 85 through port 106 is shunted to ports 101 and 102 which are, in turn, connected to outlet 104. This shunting effect is produced by the valleys 87 and 88 formed in the periphery of the shuttle. The axial length of each shuttle valley is such that it spans the distance from port 106 to port 101 or 102. Where, however, the shuttle 86 is moved from the neutral position shown in FIG. 2 to a left terminal position, not shown, the lands 90 and 91 of the shuttle will block off communication between ports 106 and 83, and between ports 84 and 101, respectively. When the shuttle is in its left terminal position, the high-pressure hydraulic fluid will pass through conduit 84 and simultaneously out through ports 80 and 82 and sets of ports B' and D' of plate 44 and into contact with the vanes 61 of assembly unit 43 whereby the rotor 54 will move in a counterclockwise direction, as seen in FIG. 5.

On the other hand, when the shuttle 86 is moved to its right terminal position, not shown, from the neutral position shown in FIG. 2, land 90 shuts off communication between port 106 and port 84, and land 92 shuts off communication between ports 83 and 102 and high-pressure hydraulic fluid is directed through ports 78—81, sets of ports A' and C', and into contact with vanes 61 whereby rotation of rotor 54 is in a clockwise direction, as viewed in FIG. 5.

There is sufficient clearance provided between rotor 54 and adapter plate 44 and member 42 to permit the hydraulic fluid to move toward shaft 40 and become accumulated in cavity 52 within member 42 and in a center pocket 76 formed in the surface 73 of housing 72 (see FIG. 4). To prevent pressure build-up in cavity 52, which would be damaging to rotary seal 51, an elongated radially extending passageway 111 is provided which communicates at one end with pocket 76 and at the other end with a second passageway 112, disposed substantially parallel to the axis of shaft 40 (see FIGS. 6, 7, 8 and 11). The upper end of passageway 112 terminates in conduit 103 which leads to outlet 104.

The internal drain for the hydraulic fluid in a compact tool of this type is exceedingly important. If passageway 111 was not provided, hydraulic pressure would build up within cavity 52 and, in seeking an outlet, the fluid would be forced along shaft 40 and distort seal 51 to such an extent as to materially increase the friction on said shaft and thereby interfere with the proper operation of the tool.

To maintain shuttle 86 in its neutral position, as shown in FIG. 2, a coil spring 113 is utilized which encompasses an end 86a of the shuttle. The encompassed shuttle end is of reduced diameter and protrudes from the left end of cavity 85, as seen in FIG. 2. The spring 113 is enclosed within a cup-shaped member 114 which is attached by any suitable means to housing 72. A stop washer 115 is affixed to the shuttle end 86a and is contacted by one end of spring 113. The other end of the spring bears against a bushing 116 held in place by the member 114.

SHUTTLE ADJUSTING MECHANISM

The opposite end 86b of shuttle 86 protrudes outwardly from the opposite end of cavity 85 and is bifurcated at 117 to effect connection with one end 118a of a bell-crank lever 118; the latter is adapted to pivot about a fixed point 119. The other end, 118b of lever 118, is pivotally connected to a short link 120; the latter, in turn, is pivotally connected to a lug 121a formed on the upper end of an elongated handle grip 121. The grip 121 is mounted on the bight portion 22a of the U-shaped handle 22 and is adapted to be rotated in opposite directions about its longitudinal axis (see FIG. 2). The upper leg 22b of handle 22 is secured by suitable bolts 122 to housing 72. The lower leg 22c of the handle 22, on the other hand, is secured by suitable bolts 123 to casing 25 of the drive end 21b of the tool. Axially aligned with handle leg 22c and secured by bolts 124 to the opposite side of casing 25, is a stub-like handle 125. Thus, when utilizing the tool, the operator may conveniently control the same with both gripping handles 22 and 125.

Because of the relatively short longitudinal adjustment required for shuttle 86 in order to move the same between its left and right terminal positions aforedescribed, a small amount of rotation of handle grip 21 is likewise required. Thus, reversal in the direction of rotation of the drive spindle 23 may be readily accomplished. As an added convenience, the tool is assembled so that the direction of twisting or turning of the handle grip 121 by the operator will correspond with the direction of rotation of the drive spindle 23.

The configuration of the handle 22 is such that it may readily facilitate carrying of the tool from one location to another.

The bolts 122, utilized in securing the upper leg 22b of handle 22, also cooperate with another pair of elongated bolts 126 (see FIGS. 1, 3, 6 and 7) to retain adapter member 42, assembly unit 43, adapter plate 44 and housing 72 in assembled relation.

While the tool has heretofore been described as of a hydraulically-acutated type, it is to be understood, of course, that the control end 21a and central portion 21c of the tool may be readily modified to accommodate pneumatic power as the actuating force. Furthermore, as previously noted, the drive end 21b may take many forms other than that shown and described, depending upon the type of work for which the tool is to be used.

Thus, it will be seen that an improved fluid pressure-actuated tool has been provided which is portable, compact, rugged and readily manipulated. The tool is capable of imparting a high driving torque in opposite directions, without requiring modification of the tool or the addition of various adapters or the like to the tool itself. The elimination of numerous external connections on the improved tool renders the same more maneuverable and capable of being utilized in situations which otherwise might be considered inaccessible.

While a particular embodiment of this invention is shown above, it will be understood, of course, that the invention is not to be limited thereto, since many modifications may be made and it is contemplated, therefore, by the appended claims, to cover any such modifications as fall within the true spirit and scope of this invention.

We claim:

1. A fluid pressure-actuated tool comprising an elongated drive member mounted for rotary movement about its longitudinal axis, a fluid pressure-responsive element mounted directly on said member for imparting rotary motion thereto, control means in fluid communication with said element for controlling the direction of rotation of said member and element, and handle means cooperating with said drive member, fluid pressure-responsive element, and control means for retaining same in assembled relation and facilitating manipulation of said tool, said control means including a housing provided with an elongated cavity having a plurality of longitudinally spaced, inwardly projecting annular collars, a high-pressure fluid inlet mounted on one side of said housing and terminating at substantially a midpoint along said cavity axis, a fluid outlet mounted on the opposite side of said housing and having a pair of branch sections terminating at said cavity at locations disposed on opposite sides of and spaced from said inlet terminus, a pair of conduits each having a corresponding end thereof terminating within said cavity at a location intermediate said inlet and a branch section terminus and the other corresponding end of each conduit being formed into multiple segments terminating at said pressure-responsive element, the multiple segments of each conduit being symmetrically arranged about the axis of rotation of said member and element, the multiple segments of said conduits being annularly spaced with respect to one another, fluid drain means interconnecting said fluid outlet with the rotary axis of said drive member, a longitudinally adjustable elongated shuttle slidably mounted within said cavity, said shuttle being provided with a plurality of longitudinally spaced, peripheral annularly-shaped valleys of greater axial dimension than said cavity collars, biasing means cooperating with said shuttle and causing the latter to normally assume a position whereby said inlet terminus and said outlet branch section termini are in communication with one another within said cavity and said member and element are in a nonrotating position, and manually actuatable means mounted on said handle means and operatively connected to said shuttle for effecting adjustment thereof from said normal position; said manually actuatable means, when actuated in one direction, effecting adjustment of said shuttle to a first position whereby one of said conduits communicates with said inlet and the second conduit communicates with said outlet and said member and element rotate in one direction; said manually actuatable means, when actuated in a second direction, effecting adjustment of said shuttle to a second position whereby the second conduit communicates with said inlet and the first conduit communicates with said outlet and said member and element rotate in a second direction.

2. A fluid pressure-actuated tool comprising an elongated drive member mounted for rotary movement about its longitudinal axis, a fluid pressure-responsive element mounted directly on said drive member for imparting rotary movement thereto, control means in fluid communication with said element for controlling the direction of rotation of said member and element and handle means cooperating with said drive member, fluid pressure-responsive element, and control means for retaining same in assembled relation and facilitating manipulation of said tool, said control means including a housing disposed in substantial axial alignment with said drive member rotary axis, said housing being provided with an elongated cavity, a high-pressure fluid inlet communicating with said cavity at a first location disposed at substantially the longitudinal midpoint of said cavity, a fluid outlet communicating with said cavity at a pair of second locations spaced longitudinally on opposite sides of said first location and substantially equidistant therefrom, a pair of conduits having corresponding ends thereof communicating with said cavity at third locations disposed on opposite sides of said first locations and intermediate said first and second locations, the other corresponding end of each conduit communicating with said fluid pressure-responsive element at a plurality of locations symmetrically arranged about the rotary axis of said drive member, fluid drain means interconnecting said fluid outlet with the rotary axis of drive member, an elongated shuttle mounted within said cavity for longitudinal movement to selected positions of adjustment, said shuttle, when in one position of selected adjustment, effecting communication of said first location with only one of said third locations and the other third location communicating with a second location whereby said drive member is rotated in only one direction, said shuttle, when in a second position of selected adjustment, effecting communication of said first location with only the other of said third locations and said first-mentioned third location communicating with the other second location, whereby said drive member is rotated only in a second direction, said shuttle, normally assuming a third position of selected adjustment, whereby said first, second and third locations are in communication and said drive member remains in a nonrotating position; and manually-operated means mounted on said handle means and operatively connected to said shuttle to effect adjustment thereof.

3. A fluid pressure-actuated tool comprising an elongated drive member mounted for rotary movement about its longitudinal axis, a fluid pressure-responsive vane-type element mounted directly on said drive member for unitary rotary movement therewith, control means in fluid communication with said element for controlling the direction of rotation of said member and element and handle means cooperating with said drive member, fluid pressure-responsive element, and control means for retaining same in assembled relation and facilitating manipulation of said tool, said control means including a housing disposed in substantial axial alignment with said drive member rotary axis, said housing being provided with an elongated cavity spaced longitudinally from an end of said drive member, the longitudinal axis of said cavity being disposed substantially transversely with respect to the rotary axis of said drive member, said housing being provided with a high-pressure fluid inlet disposed to one side of said cavity, said inlet communicating with said cavity at a first location, a fluid outlet disposed on the opposite side of said cavity and communicating with the cavity at second locations spaced longitudinally from said first location and on opposite sides thereof; a drain passageway having one end thereof in continuous communication with said drive member and the other end thereof in continuous communication with said outlet, and a pair of conduits having the corresponding ends thereof communicating with said cavity at third locations disposed on opposite sides of said first locations and intermediate said first and second locations, the other corresponding end of each conduit being formed into multiple segments communicating with said vane-type element and being symmetrically arranged about the rotary axis of said element, said cavity being provided with inwardly extending collars disposed intermediate adjacent locations, an elongated shuttle mounted for longitudinal adjustment within said cavity, said shuttle having first peripheral portions in slidable sealing engagement with said collars and recessed second peripheral portions not engageable with said collars, biasing means disposed within said cavity and cooperating with said shuttle to effect retention of said shuttle in a neutral position whereby said first, second and third locations are in communication with one another and said drive member is in a nonrotating position, and manually-operated means mounted on said handle means and connected to said shuttle to effect longitudinal adjustment thereof from said neutral position to either a first selected position whereby only one of said third locations is in communication with said first location and the other third location is in communication with a second location and said fluid-responsive element and said drive member are rotated in one direction, or a second selected position whereby only the other of said third locations is in communication with said first location and the first-mentioned third location is in communication with a second location and said fluid-responsive element and said drive member are rotated in the opposite direction.

4. A fluid pressure-actuated tool comprising an elongated drive member mounted for rotary movement about its longitudinal axis, a fluid-responsive vane-type element keyed to said drive member and rotatable therewith as a unit, control means for controlling the direction of rotation of said drive member and element, and handle means cooperating with said drive member, fluid-responsive element, and control means for retaining same in assembled relation and facilitating manipulation of said tool, said control means including a housing disposed in substantial axial alignment with said drive member rotary axis, said housing being provided with an elongated cavity, the axis of which is disposed substantially transversely with respect to the axis of rotation of said drive member, a high-pressure fluid inlet mounted on one side of the drive member rotary axis and communicating with said cavity at a first location disposed at substantially the longitudinal midpoint of said cavity, a fluid outlet mounted substantially diametrically opposite said inlet and communicating with said cavity at second locations longitudinally spaced from and on opposite sides of said first location, a pair of conduits communicating at one end with said cavity at third locations longitudinally spaced from said first location and intermediate said first and second locations, the opposite ends of said conduits each being formed into two branches which communicate with said fluid-responsive vane-type element and are disposed about the drive member rotary axis and in diametrically opposed relation, the branches of one conduit are transversely aligned with respect to the branches of the other conduit, and a drain passageway having one end thereof in continuous communication with the end of said drive member adjacent said housing and the other end of said passageway in continuous communication with said outlet; a longitudinally adjustable elongated shuttle mounted within said cavity and biased to assume a neutral position wherein said first, second and third locations are in communication with one another and said drive member and element assume a nonrotating position, said shuttle, when in a first position of selected adjustment from said neutral position, effecting communication only between said first location and one of said third locations whereby said drive member and element rotate in only one direction, said shuttle, when in a second position of selected adjustment from said neutral position, effecting communication only between said first location and the other of said third locations whereby said drive member and element rotate in the opposite direction, and a substantially U-shaped handle mounted on said housing and having an adjustable portion thereof connected to said shuttle to effect longitudinal movement of the latter.

5. The tool recited in claim 4, wherein the fluid-responsive vane-type element is provided with a plurality of radially adjustable vanes, and the end of each branch communicating with said fluid-responsive element being divided into two passageways which are in radial spaced relation with respect to said element vanes and effect fluid balance thereof.

6. A fluid pressure-actuated tool comprising a drive member mounted for rotary movement about its longitudinal axis, a fluid pressure-responsive element mounted directly on said member for imparting rotary motion thereto, control means in fluid communication with said element for controlling the direction of rotation of said member and element; said control means including a housing provided with an elongated cavity, and an elongated longitudinally adjustable shuttle mounted within said cavity, and an exposed substantially U-shaped carrying handle mounted on said housing, said handle having an adjustable grip section formed in the bight portion of the U-shaped handle and connected to said shuttle to effect selective adjustment thereof; said cavity being provided with a high-pressure fluid inlet, a fluid outlet spaced longitudinally from said inlet, conduits extending angularly therefrom, the cavity-communicating ends of said conduits being spaced longitudinally from each other and from said inlet and outlet, the other ends of said conduits being spaced from one another and communicating with said fluid pressure-responsive element, and a drain passageway formed in said housing and having one end thereof in continuous communication with the end of said drive member adjacent said control means housing and the other end of said passageway in continuous communication with said fluid outlet; said shuttle, when actuated to one position of adjustment by manipulation of said grip section in one direction, effecting communication between said inlet and one of said conduits whereby said member and element rotate in one direction; said shuttle, when actuated to a second position of adjustment by manipulation of said grip section in the opposite direction, effecting communication between said inlet and the other of said conduits whereby said member and element rotate in a second direction; said shuttle, when automatically actuated to a third position of adjustment upon release of said grip section, effecting communication between said inlet and outlet whereby said member and element remain idle.

7. A fluid pressure-actuated tool comprising an elongated drive member mounted for rotary movement about its longitudinal axis, a fluid pressure-responsive element mounted directly on said member for imparting rotary motion thereto, control means in fluid communication with said element for controlling the direction of rotation of said member and element, and handle means cooperating with said drive member, fluid pressure-responsive element and control means for retaining some in assembled relation and facilitating manipulation of said tool; said control means including a housing disposed in substantial axial alignment with said drive member rotary axis, a disc-like first adapter having one surface thereof in face-to-face contact with the end of said housing adjacent said pressure-responsive element, the other surface of said first adapter being in face-to-face contact with a surface of said pressure-responsive element and a second adapter in face-to-face contact with the opposite surface of said pressure-responsive element, said drive member being supported for rotation about its longitudinal axis by said first and second adapters; said housing being provided with an elongated cavity, a high-pressure fluid inlet mounted on said housing and in communication with said cavity, a fluid outlet mounted on said housing and communicating with said cavity at locations longitudinally spaced from and at opposite sides of the location of communication between said inlet and cavity, said housing being provided with a pair of conduits connecting said cavity and said fluid pressure-responsive element, the corresponding ends of said conduits communicating with said cavity at locations on opposite sides of and spaced from the location of communication of said inlet and cavity, said corresponding ends being also spaced from and between the locations of communication between said outlets and cavity, the other corresponding ends of said conduits being annularly spaced from one another about the axis of rotation of said member and element, the locations of communication between said cavity and said inlet, said outlet, and said conduits being separated from one another by internal collars formed in said cavity, and an elongated shuttle mounted for selective longitudinal adjustment within said cavity, said shuttle being provided with a plurality of longitudinally spaced annular valley sections of greater axial dimension than said collars, the adjustment of said shuttle within said cavity effecting selective interconnections between said locations of communication within said cavity.

References Cited in the file of this patent
UNITED STATES PATENTS

| | | |
|---|---|---|
| 2,077,733 | Amtsberg | Apr. 20, 1937 |
| 2,476,486 | Ferguson | July 19, 1949 |
| 2,632,424 | Slomer | Mar. 24, 1953 |
| 2,884,902 | Headings | May 5, 1959 |